(12) United States Patent
Kobayashi (10) Patent No.: US 6,882,854 B2
(45) Date of Patent: Apr. 19, 2005

(54) SYSTEM AND METHOD FOR DISCRIMINATING A PARTICULAR RADIO COMMUNICATION NETWORK AMONG A PLURALITY OF RADIO COMMUNICATION NETWORKS

(75) Inventor: Koichi Kobayashi, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 471 days.

(21) Appl. No.: 09/815,006

(22) Filed: Mar. 23, 2001

(65) Prior Publication Data

US 2002/0002056 A1 Jan. 3, 2002

(30) Foreign Application Priority Data

Mar. 24, 2000 (JP) ........................................ 2000-083771

(51) Int. Cl.[7] ............................................. H04B 15/00
(52) U.S. Cl. ........................ 455/502; 455/41.2; 455/500
(58) Field of Search ........................... 455/550.1, 41.2, 455/41.3, 556.1, 556.2, 557, 566, 90.1–90.3, 432.1, 435.1

(56) References Cited

U.S. PATENT DOCUMENTS

| | | | | |
|---|---|---|---|---|
| 5,450,613 A | * | 9/1995 | Takahara et al. | 455/517 |
| 5,835,863 A | * | 11/1998 | Ikenouchi et al. | 455/567 |
| 5,950,130 A | * | 9/1999 | Coursey | 455/432.1 |
| 6,094,565 A | * | 7/2000 | Alberth et al. | 455/575.3 |
| 6,181,284 B1 | * | 1/2001 | Madsen et al. | 343/702 |
| 6,366,622 B1 | * | 4/2002 | Brown et al. | 375/322 |

FOREIGN PATENT DOCUMENTS

| | | | | |
|---|---|---|---|---|
| JP | 62-113391 | * | 5/1987 | H05B/37/02 |
| JP | 11-346230 | | 12/1999 | |

OTHER PUBLICATIONS

Takeuchi "Lighting Adjustment Interlocking Control System" Ralph McElroy Translation Company (translation of Sho 62–113391).*

Nikkei Electronics, "Bluetooth Sweeps O ver Handheld PC", No. 759, pp. 139–150, Dec. 13, 1999.

Interface, "Details of Bluetooth That Aims to an Open Standard", pp. 112–117, Feb. 2000.

Kobayashi, K., "Communication Sy stem and Mobile Communication Dev ice, Portable Inf ormation Proccessing Dev ice and Data Com munication Method Used in the Sy stem", U.S. Appl. No. 09/653,949, filed Sep. 1, 2000.

Masaki, T. et al., " An Antenna Arragem ent of an Information Processor", Ser. No. 456,986, filed Dec. 7, 1999.

* cited by examiner

*Primary Examiner*—Nay Maung
*Assistant Examiner*—Tanmay Lele
(74) *Attorney, Agent, or Firm*—Finnegan, Henderson, Farabow, Garrett & Dunner, L.L.P.

(57) ABSTRACT

A radio network system is provided for discriminating a particular network connection among a plurality of networks for coupling a plurality of radio communication equipment. The system includes a master radio communication equipment and a slave radio communication equipment each having at least one light emitting element for indicating a particular coupling of a radio network among a plurality of radio networks, respectively. The light emitting element provided in the master radio communication equipment and the slave radio communication equipment flickers synchronously with a predetermined lighting interval or a predetermined lighting color for discriminating the particular coupling of the network.

12 Claims, 11 Drawing Sheets

| | LED LIGHTING DATA | LED LIGHTING STATUS | |
|---|---|---|---|
| 401 | 00000001 | 1 SEC. INTERVAL | 411 |
| 402 | 00000010 | 2 SEC. INTERVAL | 412 |
| | ⋮ | ⋮ | |
| 403 | 01000001 | GREEN | 413 |
| 404 | 01000010 | ORANGE | 414 |
| | ⋮ | ⋮ | |
| 405 | 10000001 | GREEN & 1 SEC. INTERVAL | 415 |
| 406 | 10000010 | GREEN & 2 SEC. INTERVAL | 416 |
| | ⋮ | ⋮ | |
| 407 | 11000001 | ORANGE & 1 SEC. INTERVAL | 417 |
| 408 | 11000010 | ORANGE & 2 SEC. INTERVAL | 418 |

SYSTEM AND METHOD FOR DISCRIMINATING A PARTICULAR RADIO COMMUNICATION NETWORK AMONG A PLURALITY OF RADIO COMMUNICATION NETWORKS

BACKGROUND OF THE INVENTION

1. Field of the Invention

The present invention relates to a radio network system, and more particularly, to an apparatus and method for distinguishing a particular radio communication network system to which equipment is coupled among a plurality of radio network systems.

2. Discussion of the Related Art

Recent wide spreads and developments of telecommunication techniques have produced various types of radio communication network systems. One of the telecommunication techniques that have been put to practical use is referred to as "BlueTooth". BlueTooth is a radio communication standard for short distance communication that utilizes the Industry Science Medical (ISM) band. Thus, the BlueTooth has recently been used for communication between equipment, for example, a personal computer (PC) and a mobile telephone; or between a PC and various peripheral devices for the PC, such as a printer, a modem, or a keyboard. Particularly, BlueTooth coupling between a PC and peripheral devices can improve the operability of the devices since the devices are coupled to the PC without any coupling cables. In order to achieve BlueTooth coupling between a PC and peripheral devices, a detachable PC card installed into the PC is commonly used.

However, since the equipment is not connected with actual cables, the radio communication network, such as BlueTooth, has a serious problem with obtaining coupling information from the radio communication equipment, i.e., the PC card, as to which network has been coupled.

Conventionally, proposals have been made to provide an indicator in the PC card in order to understand an operational status of a radio local area network (radio-LAN). Thus, a light emitting diode (LED) has been provided in the PC card for indicating the status of the radio LAN.

However, an LED indicator is difficult to promptly discriminate a presently coupled network among a plurality of networks, or an availability of data communication for an operating equipment.

In order to indicate a coupling status of a particular network, it has also been proposed to indicate the availability, of the network equipment, for coupling a plurality of networks on a display.

These conventional techniques are difficult to promptly discriminate a particular network among a plurality of networks in order to determine which network is coupled to the operating equipment or which equipment is presently available to perform data communication.

SUMMARY OF THE INVENTION

Therefore, there is a need for a system and method to discriminate a particular radio communication network, to which a device is coupled, among a plurality of radio communication networks.

A system and method for distinguishing a particular coupled radio communication network to an operating system among a plurality of radio communication networks according to the invention overcomes the aforementioned problems and defects that are present in conventional systems and methods.

In accordance with the present invention, there is provided a radio network system comprising: a first radio communication equipment for transmitting/receiving data via radio, the first radio communication equipment including a first radio communication mechanism for performing radio communication and a first discrimination mechanism for visually discriminating a particular coupling of the communication network; a second radio communication equipment for transmitting/receiving data to the first radio communication equipment via radio, the second radio communication equipment including a second radio mechanism for performing radio communication to the first radio communication equipment and a second discrimination mechanism for visually discriminating a particular coupling of the communication network; and a flickering mechanism for synchronously flickering both the first discrimination mechanism and the second discrimination mechanism with a particular lighting interval, upon establishment of the particular coupling of the communication network.

Also in accordance with the present invention, there is provided a radio communication apparatus comprising: means for discriminating a communicable apparatus through a communication network; means for generating a control data for discriminating the communicable apparatus; means for emitting a light; means for controlling the emitting means in accordance with the control data generated by the generating means; and means for transmitting the control data to the communicable apparatus through the communication network.

Further in accordance with the present invention there is provided a radio communication apparatus comprising: means for discriminating a communicable apparatus through a communication network; means for emitting a light; means for receiving a control data from the communicable apparatus; and means for controlling the emitting means in accordance with the control data received by the receiving means.

Additionally in accordance with the present invention there is provided a method for controlling radio communication equipment comprising a discrimination mechanism for visually discriminating a particular radio network communication system to other radio communication equipment coupled via a radio, comprising the steps of: coupling the radio network with other radio communication equipment through a set-up operation; transmitting control data for controlling the discrimination mechanism to the other communication equipment; and controlling the discrimination mechanism in accordance with the transmitted controlling data.

Further in accordance with the present invention, there is provided a method for communicating radio data among a plurality of master equipment and a plurality of slave equipment for the respective plurality of master equipment, comprising the steps of: constructing a radio communication network between a master equipment and the corresponding slave equipment for the master equipment; acquiring lighting data from other master equipment for the respective radio communication networks; transmitting the acquired lighting data to the slave equipment; displaying the received lighting data by selecting a lighting status among the displayed lighting data; demonstrating the light emitting element by selecting lighting status for determining the lighting status; transmitting the determined lighting status from the slave equipment to the master equipment and other slave equipment; and turning on the light emitting element in the slave equipment in accordance with the transmitted lighting status.

Advantages of the present invention appear in the following description, and will be obvious from the description or by practicing the present invention.

BRIEF DESCRIPTION OF THE DRAWINGS

A more complete appreciation of the present invention and many of the attendant advantages will be readily obtained as the same becomes better understood by reference to the following detailed description when considered in connection with the accompanying drawings in which like reference numerals designate identical or corresponding parts throughout the several views.

DESCRIPTION OF THE PREFERRED EMBODIMENTS

Reference will now be made in detail to embodiments of the present invention examples which are illustrated in accompanying drawings. Wherever possible, the same reference numbers will be used throughout the drawings to refer to the same or like parts.

Figure 1:
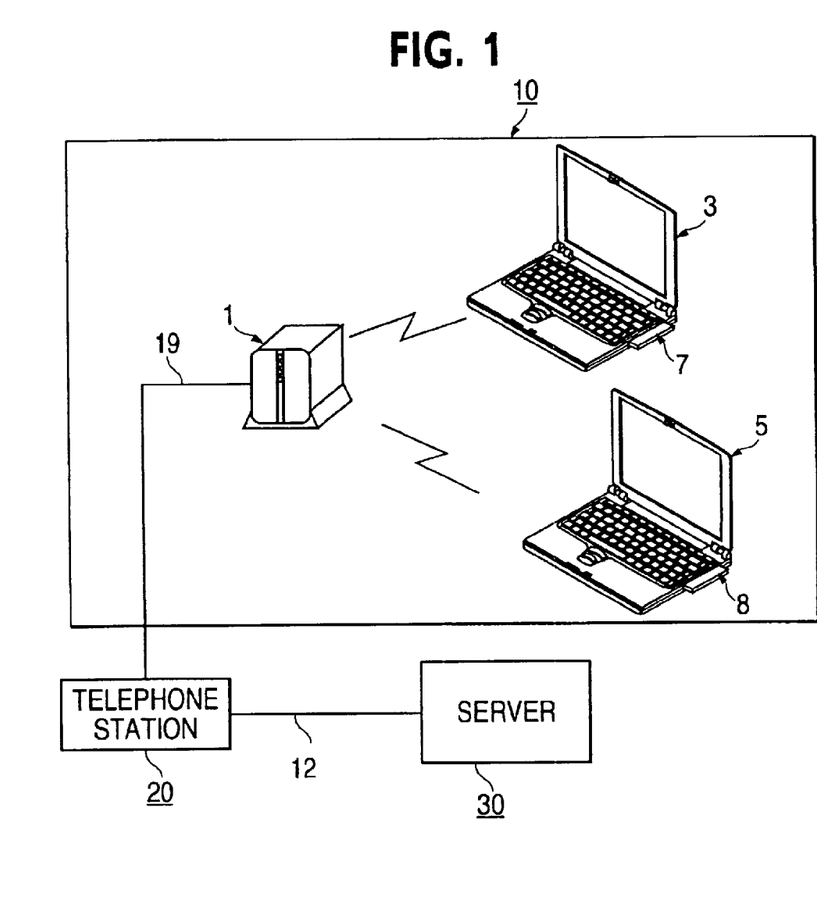
FIG. 1 illustrates a construction of a radio communication system of an embodiment of the present invention.

FIG. 1 illustrates construction of a Piconet that is similar to a radio communication network under the BlueTooth system. Usually, the Piconet includes a master device and a plurality of slave devices. As illustrated in FIG. 1, the Piconet 10 includes an access point 1 as a master device for performing radio communication and a plurality of slave devices, for example, personal computers (PCs) 3, 5. The master access point 1 includes a built-in BlueTooth modem (shown in FIG. 5). In this embodiment, each of the slave PCs 3, 5 have installed respective detachable PC cards 7, 8 in order to communicate with the master device by radio.

Typically, the BlueTooth system is used for short distance communication by using the ISM band, i.e., a frequency band between 2.40 GHz and 2.50 GHz. Usually, under the BlueTooth system, the Piconet radio communication network 10 includes a maximum of eight of the master and slave devices. In this embodiment, each of the slave PCs 3, 5 does not include a BlueTooth modem for performing radio communication to the master access point 1. The BlueTooth modem is provided in each of the detachable PC cards 7, 8 that are installed in each of the PCs 3, 5 respectively. Thus, when the PC cards 7, 8 are installed in the PCs 3, 5, each of the slave PCs can perform radio communication with the master access point 1.

The BlueTooth modem in the master access point 1 is coupled to a telephone station 20 through a modular cable 9. The telephone station 20 is connected to an outer server 30 through a public network 12.

Figure 2:
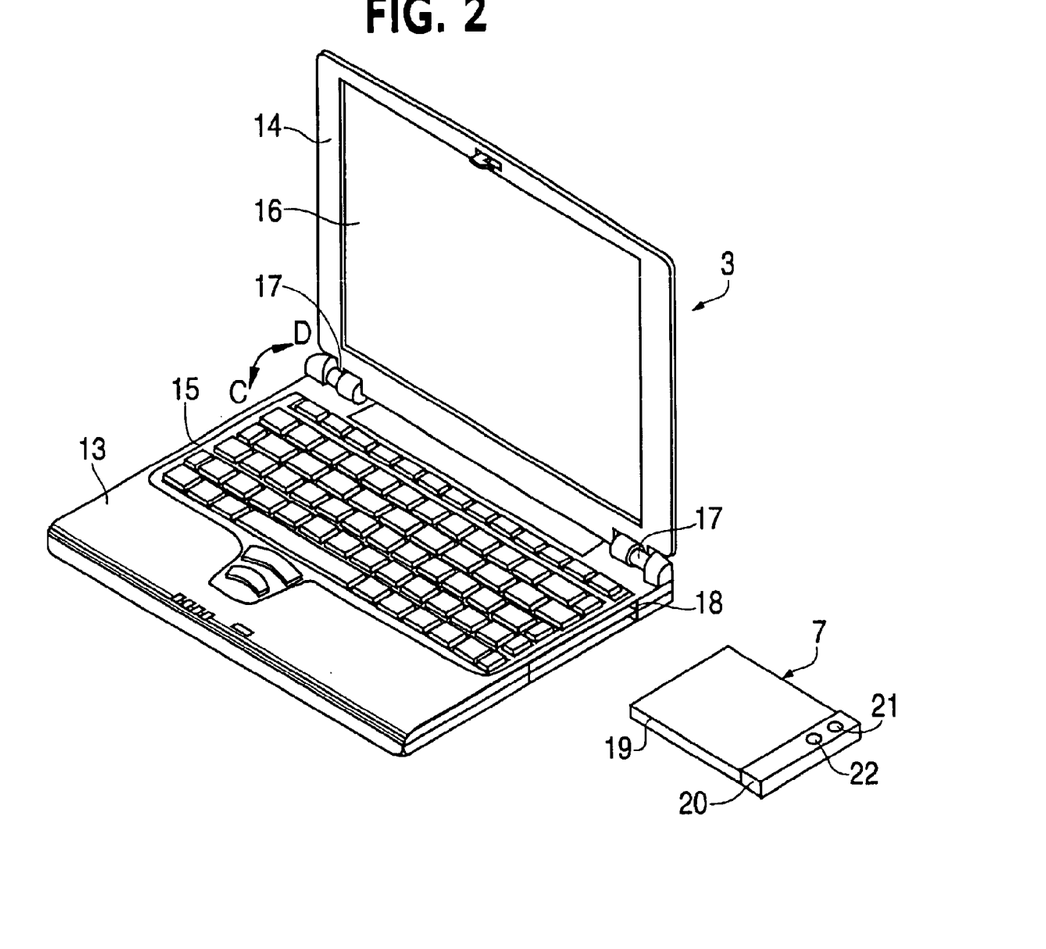
FIG. 2 is a perspective view of a PC and a PC card that are applied for use in the radio communication system of FIG. 1.

FIG. 2 illustrates the slave PC 3 and the detachable PC card 7 depicted in FIG. 1. Thus, the PC 3 includes a main body 13 and a rotatable display unit 14 that is attached to the main body 13 in order to cover the main body 13 when the computer is closed. The main body 13 has an opening for attaching a keyboard 15. The keyboard 15 includes a plurality of keys provided on a keyboard panel. The display unit 14 includes a liquid crystal display (LCD) panel 16 and a housing for the display panel 16.

Along one elongated edge of body 13, hinge portions 171, 172 are provided for attaching the rotatable display unit 14. Along one sidewall of the body 13, a PC card slot 18 is provided for installing a PC card 7. The PC card slot 18 conforms to the Personal Computer Memory Card Industry Association (PCMCIA) for installing the PC card 7 into the card slot 18 in order to extend various functions of the PC 3.

The PC card 7 is a PC card type-II extension, comprising an installation portion 19 and a projected portion 20. In the projected portion 20, an antenna for the BlueTooth system is provided. In order to increase performances of the radio communication, the projected portion 20 is positioned outside the body 13, and when the installation portion 19 of the PC card 7 is completely installed into the card slot 18.

Further, one surface of the projected portion 20 of the PC card 7 includes a pair of light emitting devices (LEDs) 21, 22 for easily distinguishing a particular Piconet radio communication network that is coupled to the slave PC. Each of the LEDs 21, 22 emits a different color, respectively. For example, the LED 21 emits a green color and the other LED 22 emits an orange color.

In this embodiment, each of the different colors, i.e., green and orange, of the LED indicates a different radio communication network that is coupled to the slave equipment. Thus, in embodiments consistent with the present invention, it becomes possible to distinguish a particular Piconet radio communication network among the plurality of radio communication networks by flickering the different color in the LEDs 21, 22.

Figure 3:
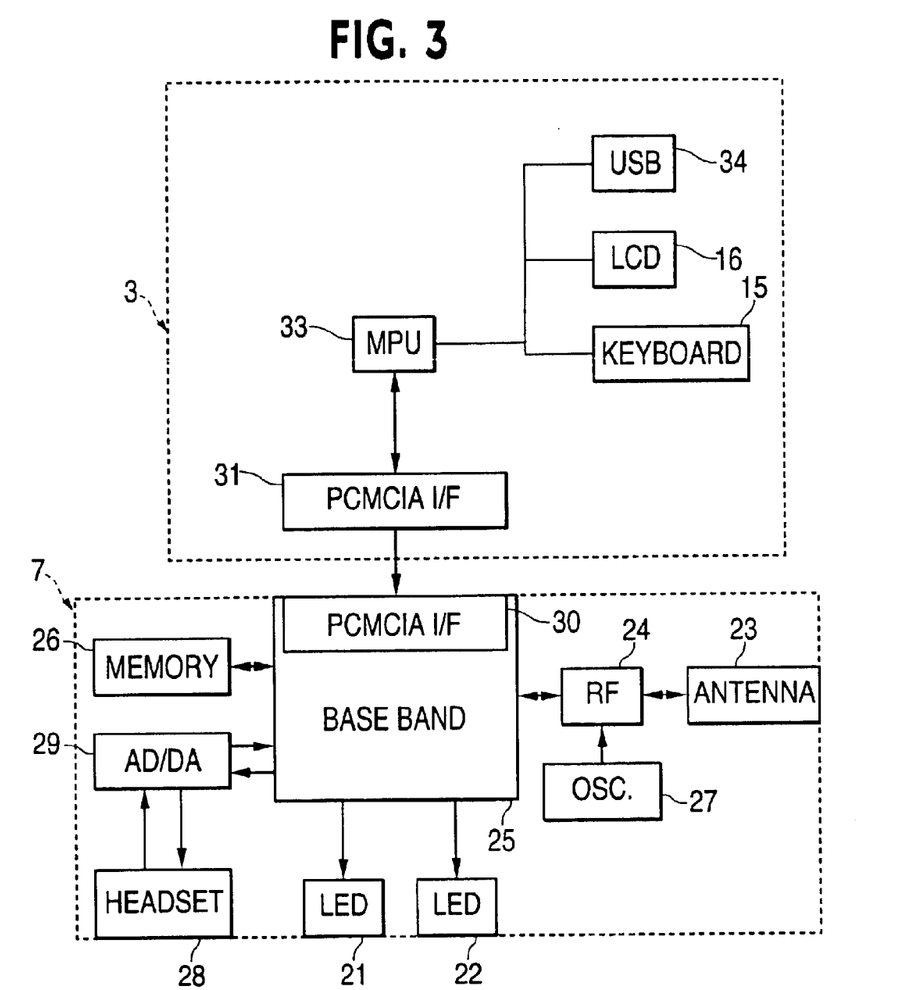
FIG. 3 is a block diagram illustrating components of the PC and the PC card of FIG. 2.

FIG. 3 depicts hardware constructions in PC 3 and PC card 7 in order to construct the BlueTooth system. As illustrated in FIG. 3, as a radio module, the PC card 7 includes an antenna unit 23, a radio frequency (RF) unit 24, a base band unit 25, a memory unit 26, a crystal oscillator 27, a headset unit 28, and an analog-digital/digital-analog (AD/DA) converter 29. The antenna unit 23 performs the BlueTooth system. Each of the LEDs 21, 22 is connected to the base band unit 25.

The base band unit 25 includes a PCMCIA interface 30 for the PC card 7. The PCMCIA interface 30 is connected to a PCMCIA interface 31 provided in PC 3 in order to transmit/receive data to PC 3. Thus, data transmission/reception between PC 3 and the master access point 1 is performed through the antenna unit 23 to the PCMCIA interface 30 in the PC card 7.

In the PC card 7, the RF unit 24 executes signal processing for the transmitting/receiving data by using a predetermined frequency from the oscillator 27. Thus, the transmitting communication data changes to a predetermined radio wave for transmitting through the antenna unit 23.

On the other hand, when the antenna unit 23 receives a signal wave, the base band unit 25 digitizes the inputted signals through the RF unit 24. Thus, the base band unit 25 converts the inputted signals into data that can be processed in the PC 3. The base band unit 25 achieves data transmission/reception to the PC 3 by using the memory unit 20.

As will be explained later, the lighting operations of LEDs 21, 22 are performed under control of a software program.

The memory 26 stores transmitting/receiving data, radio communication protocols for the BlueTooth system, and control programs for lighting the LEDs 21, 22. Further, the memory 26 stores a LED lighting data table that indicates, for example, a predetermined lighting interval for the LED.

Figure 4:
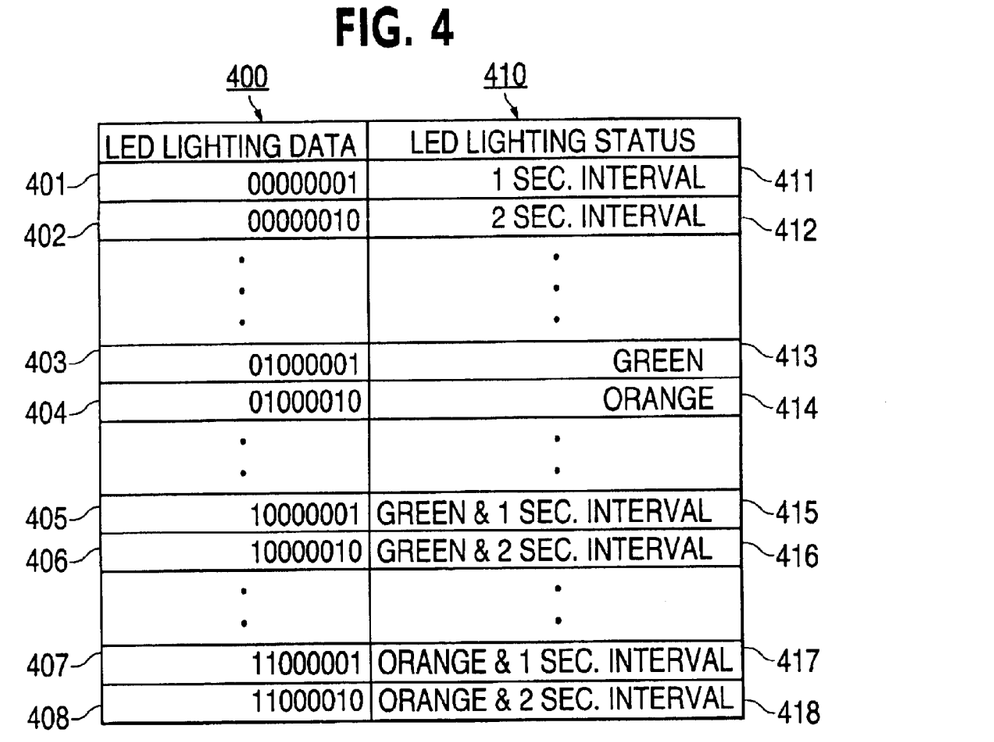
FIG. 4 is a table listing LED light emitting information.

FIG. 4 shows an example of the LED lighting data table. This table defines a lighting condition for the LED in corresponding to a LED lighting data of 1 byte that is supplied from the mater access point 1 (FIG. 1). Thus, when the PC card 7 receives a LED lighting data 401 of 1 byte, e.g., (00000001), from the master device, the corresponding LED lighting status data 41 1, i.e., one second interval for the LED lighting, is set into a register (not shown) in the base band unit 25 of the PC card.

In this table, the top 2 bits in the LED lighting data of 1 byte are used for distinguishing a lighting interval and a particular color of lighting. For example, the top 2 bits of "00" instructs the lighting interval, and the top 2 bits of "01" instructs the lighting color. The top 2 bits of "10" or "11" instruct both the lighting interval and the lighting color.

Namely, the LED lighting data 401 of "00000001" instructs to light the LED at every 1 second-intervals. The lighting data 402 of "00000010" instructs to light the LED at every 2 second-intervals. The lighting data 403 of "01000001" instructs to light the LED with a green color. The lighting data 404 of "01000010" instructs to light the LED with an orange color. The lighting data 405 of "10000001" instructs to light the LED with a green color at every 1-second intervals. The lighting data 406 of "10000010" instructs to light the LED with a green color at every 2-second intervals. The lighting data 407 of "11000001" instructs to light the LED with an orange color at every 1-second intervals. The lighting data 408 of "11000010" instructs to light the LED with an orange color at every 2-second intervals.

In FIG. 3, the crystal oscillator 27 supplies a reference wave to the RF unit 24. A head set jack unit 28 is used to connect a head set in order to input/output audio signals. The AD/DA converting unit 29 converts the input analog data from the head set jack unit 28 to digital data and converts digital data supplied from the base band unit 25 into analog signals for supplying the head set jack unit 28.

The PC 3 includes a PCMCIA interface unit 31 for transmitting/receiving data to the PC card 7, a MPU 33 for controlling the entire operation of the PC 3 and the PCMCIA interface 31. Further, the MPU 33 is connected to a Universal Serial Bus (USB) 34 for interfacing the extended functions, the LCD 16 for displaying, and the keyboard 15 for inputting data.

Thus, the PCMCIA interface unit 31 in the PC 3 transmits/receives data to the PC card 7 based upon the PCMCIA standards. The MPU 33 executes the entire control operation for the PC 3 and the data processing. The USB 34 is an interface for transmitting/receiving serial data. Various USB peripheral devices can be connected to the USB 34.

Figure 5:
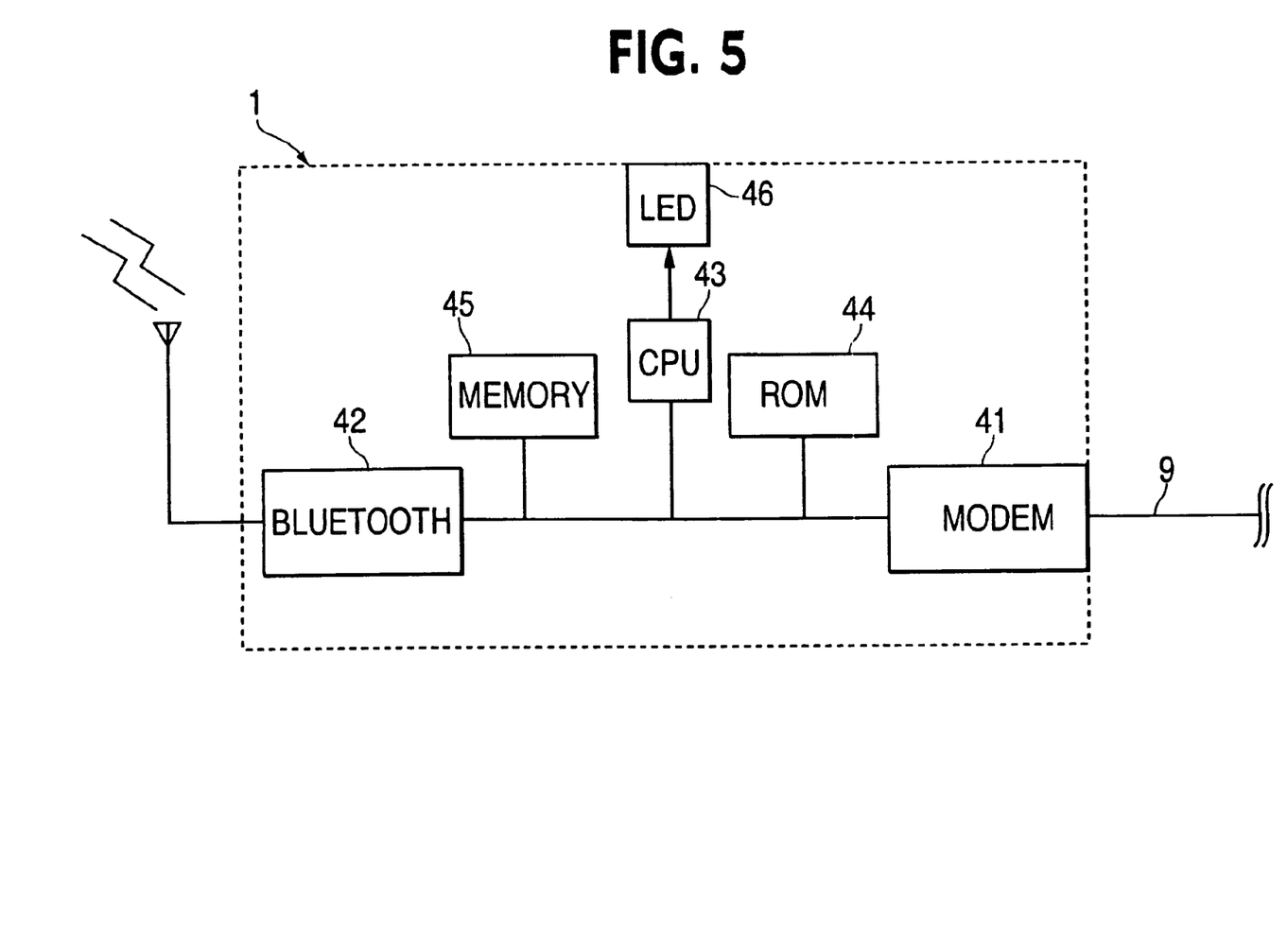
FIG. 5 is a block diagram illustrating components of an access point of the radio communication system of FIG. 1.

FIG. 5 depicts hardware construction of the access point 1 as a master device. As illustrated in FIG. 5, the master access point 1 includes a modem unit 41, a BlueTooth unit 42 and a CPU 43. The modem unit 41 is coupled to a public network through modular cable 9. The BlueTooth unit 42 transmits and receives data to the modem unit 41. Thus, the modem unit 41 converts analog data, that are inputted through the modular cable 9 from a public network, to digital data. The converted digital data is transmitted to the BlueTooth unit 42. On the other hand, the digital data inputted into the BlueTooth unit 42 is converted to analog data at the modem unit 41 in order to transmit the data to the public network. Thus, the BlueTooth unit 42 executes radio communication. The functions of the BlueTooth unit 42 corresponds to the combined functions of the antenna unit 21, the RF unit 22, the base band unit 23, and the crystal oscillator 24 in the PC card 7. The CPU 43 controls the entire operation of the access point 1 and executes data processing.

The master access point 1 further includes a read only memory (ROM) 44, a memory 45 and a master LED 46. The ROM 44 stores basic operational radio protocols for the access point 1 and radio communication protocols for the BlueTooth unit 42. The LED lighting data table, as shown in FIG. 4, is also stored in ROM 44. The memory 45 is comprised of a plurality of dynamic random access memories (DRAMs) in order to store basic operation programs for the access point 1, device drivers, application programs for executing objects and processing data. The master LED 46 is used for distinguishing a particular Piconet that is coupled to the operating equipment at the time.

Figure 6:
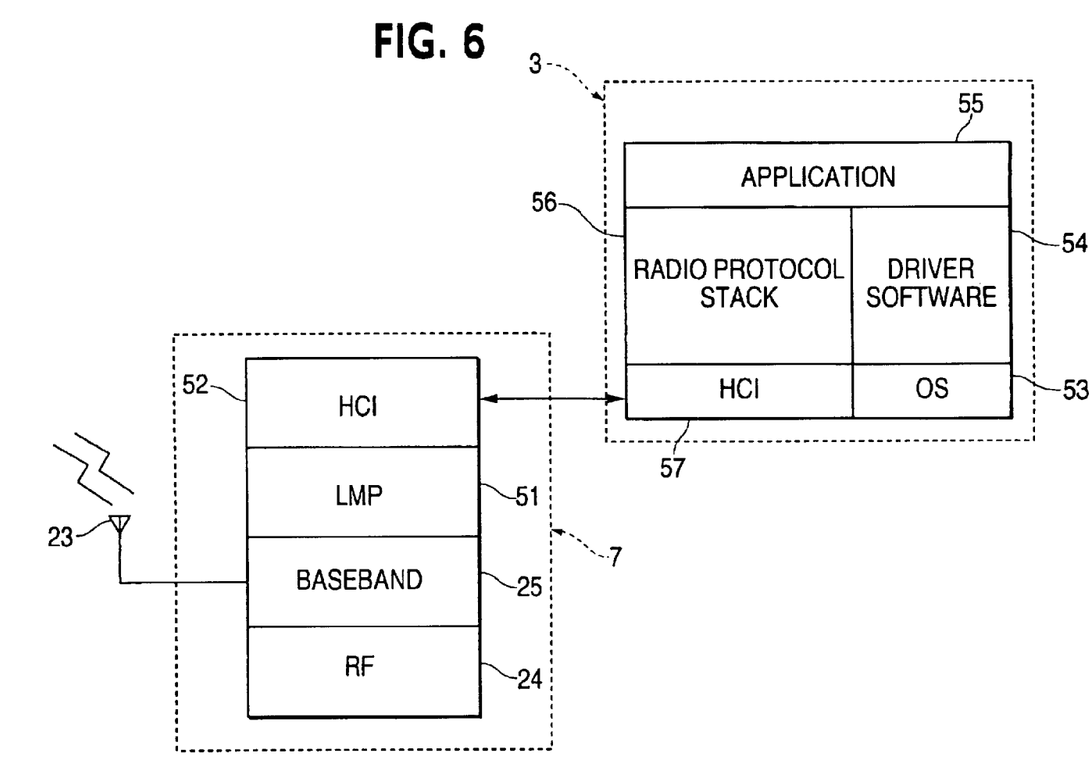
FIG. 6 is a block diagram illustrating software components in the PC and the PC card.

FIG. 6 explains software constructions for PC 3 and PC card 7. In this embodiment, the radio protocol stack for the BlueTooth system is provided in PC 3. The PC card 7 includes hardware of the RF unit 24 and the base band unit 25. A Link Management Protocol (LMP) 51 and a first Host Control Interface (HCI) 52 are mounted on the base band unit 25. The LMP 51 controls radio links to a radio communication device, e.g., the access point 1. Namely, the LMP 51 controls connection status or consumption of power source after establishing radio connection to the radio communication device. The first HCI 52 executes the PCMCIA interface connection to PC 3. Thus, the first HCI 52 becomes the PCMCIA interface to PC 3.

The PC 3 includes an Operating System (OS) 53, driver software 54, and application software 55 that are usually mounted in a standard PC. The OS 53 is basic software for controlling the total operations of the hardware and the software for PC 3. The driver software 54 is an interface program for controlling various peripheral devices. The application software 55 is an application program that operates the OS 53.

In order to achieve the embodiment consistent with the invention, the PC 3 further includes a radio protocol stack 56 for a radio communication of 2.4 GHz band in order to determine the BlueTooth system, and a second HCI 57 for performing the PCMCIA interface to the PC card 7.

Figure 7:
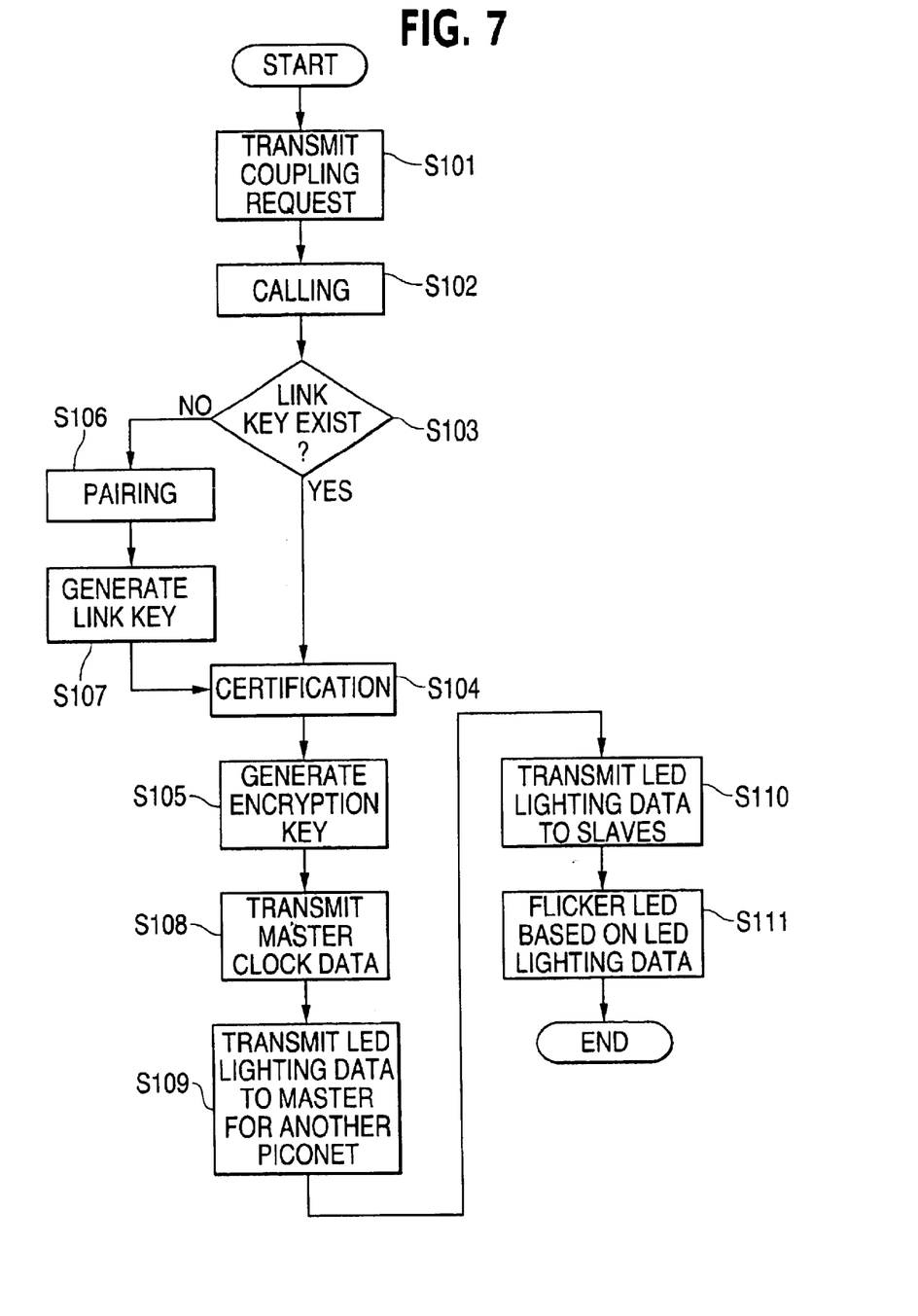
FIG. 7 is a flowchart of a first embodiment of master equipment used in a radio communication system consistent with the present invention.

FIG. 7 illustrates operations of the master device in the first embodiment of the invention. The master device, at first, transmits a request to connect to the object equipment for constructing the Piconet (Step S101). Then, the master device sends a request to the BlueTooth unit, in an object slave equipment, to designate an inherent 48 bits address for the BlueTooth unit (Step S102). The requested slave equipment responds to the request from the master device. Next, the master device distinguishes whether a link key has already existed (Step S103). Typically, the link key is used for executing mutual certifications for the connecting devices. If the link key exists (Step S103, YES), the master device operation goes to a certification process (Step S104).

The certification process for the slave device, intended to be coupled, is executed by using parameters of an inherent address of 48 bits and a random number 128 bits for the BlueTooth device, and the generated link key (Step S104). Then, an encryption key for ciphering is generated by using the random number of 128 bits and the link key as the parameters (Step S105), If the link key does not exist (Step S103, NO), the master device goes to a pairing process (Step S106). If the link key does not exist, then the master device is already coupled or the link key is lost, although the master device has already coupled and the link key has already been generated.

The pairing process, for certifying the coupling target, is executed by generating a temporary link key in accordance with the random number of 128 bits and a Personal Identification Number (PIN) code of 1~16 byte that is optionally changeable by a user (Step S106).

Next, a link key is generated by using the inherent address for the BlueTooth device of 48 bits, the random numbers of 128 bits, and the temporary link key generated in the pairing process of Step S106 as the parameters (Step S107). Then, the process moves to the certification process (Step S104). The master device, for managing the Piconet, transmits master clocks to the slave devices in the same Piconet in order to decide the timing and frequency of a hopping interval for the transceiver in the BlueTooth unit; and instructs to communicate synchronously to the master clock (Step S108).

The set-up operation has been completed during the abovementioned processes. Thus, it becomes possible to establish communication of the ciphered data, by using the encryption key, and the Piconet that has been established.

In order to prevent the lighting interval of the Piconet from misunderstanding a similar LED lighting interval of another Piconet, the master device transmits a LED lighting data of, for example, (00000001), to a master device of another Piconet (Step S109). The method for notification of the LED lighting data in use in another Piconet is transmitted through a scatter net network for the BlueTooth system. The scatter net is a network that links the Piconets together. It is possible for a master device to become a slave device for another Piconet.

It is also possible to synchronize the LED lighting interval to a master clock. The master clock is a clock for deciding a frequency hop interval for the BlueTooth system. The LED 46, provided in the access point 1, flickers synchronously with the LED in the devices of the Piconet based on the LED lighting data (Step S110).

Figure 8:
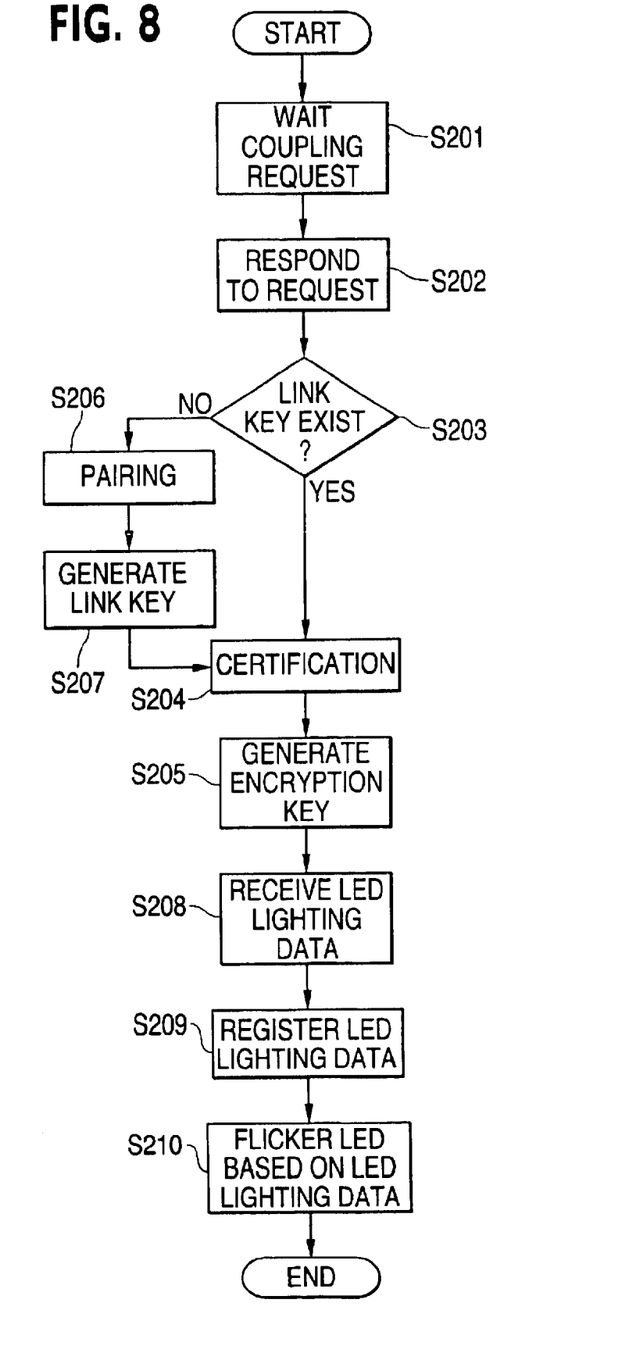
FIG. 8 is a flowchart of a first embodiment of slave equipment used in a radio communication system consistent with the present invention.

FIG. 8 depicts a flowchart for showing operations in the slave devices. The slave devices wait for a coupling request from a master device (Step S201). The slave devices respond to the coupling request, an inherent 48 bits address, from the master device (Step S202) and examines the existence of the link key (Step S203).

If the link key exists (Step S203, YES), the process goes to a certification process (Step S204). In this case, the certification process is executed by using the inherent address of 48 bits and random number of 128 bits, and a link key generated previously as parameters (Step S204). Then, an encryption key for ciphering is generated by using the random numbers of 128 bits and the link key as the parameters (Step S205).

If the link key does not exist (Step S203, NO), then the process goes to a pairing process (Step S206). The pairing process for certifying the coupling target is executed by generating a temporary link key in accordance with the random number of 128 bits and the PIN code of 1~16 byte that is optionally changeable by a user (Step S206).

Next, a link key is generated by using the inherent address of 48 bits for the BlueTooth device, the random numbers of 128 bits, and the temporary link key generated in the pairing process of Step S206 as the parameters (Step S207). Then, the process moves to the certification process (Step S204).

After the certification process of Step S204, an encryption key for ciphering is generated by using the random numbers of 128 bits and a link key as the parameters (Step S205). Once the master clock receives the timings and hopping for the transceiver in the BlueTooth unit from the master of the Piconet, communications are performed synchronously with the master clock. According to the above mentioned processes, the setup operation is completed. Thus, it becomes possible to communicate the ciphered data by the encryption key. The construction of the Piconet is thus completed.

After the Piconet construction is completed, the slave equipment receives LED lighting data from the master device (Step S208), and determines the status of the LED lighting data in the LED lighting table. The LED lighting status data is registered in the base band unit 23 (Step S209). The base band unit 23 makes the LED 16 flicker according to the LED lighting data (Step S210).

In this embodiment, the network is distinguished in view of the lighting intervals of the LED. It is possible to discriminate the coupled network in view of the lighting color or the lighting color and lighting intervals together, according to the LED lighting data.

Figure 9:
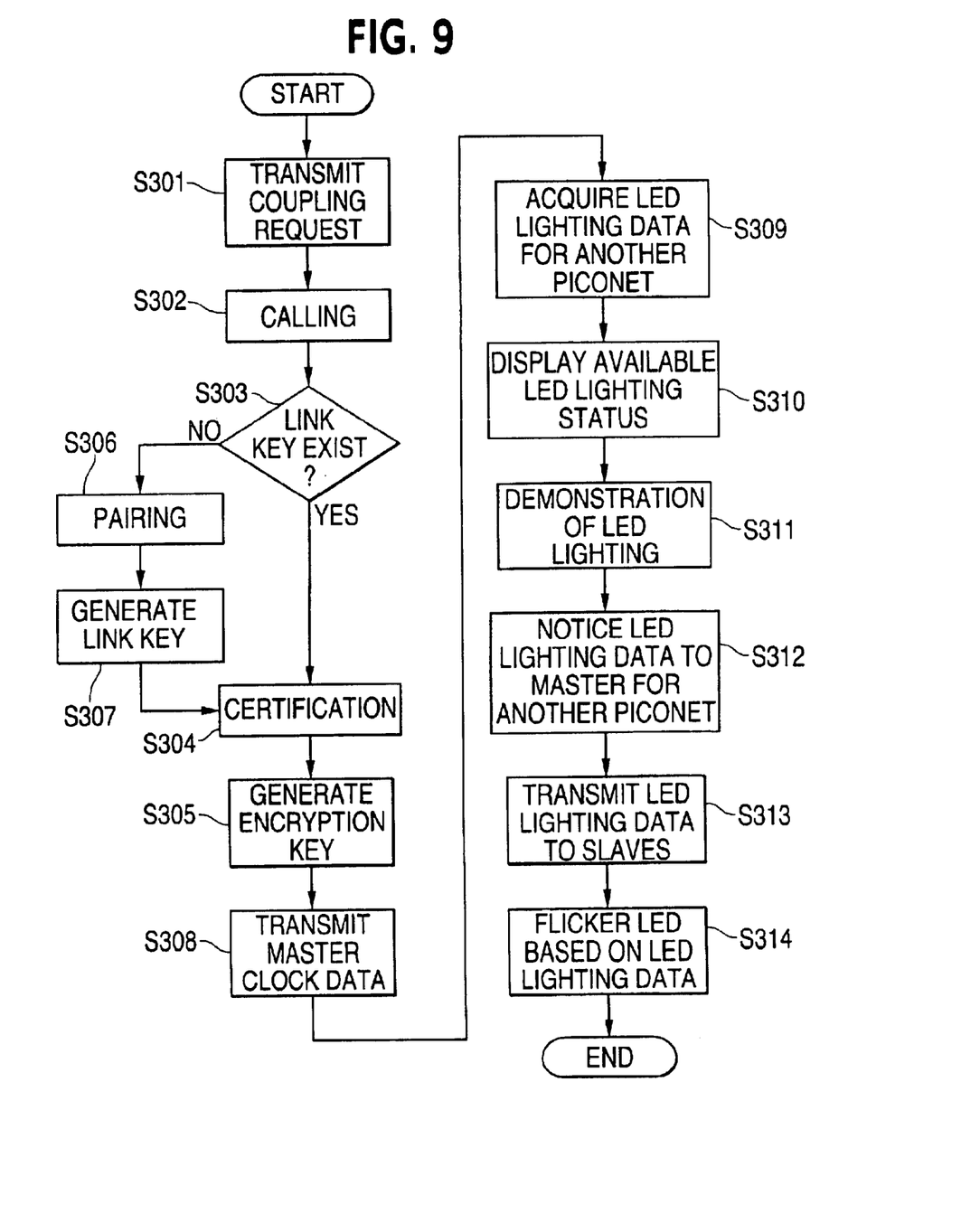
FIG. 9 is a flowchart of a second embodiment of the master equipment used in a radio communication system consistent with the present invention.

FIG. 9, a flowchart for the master equipment, explains a second embodiment of the equipment consistent with the invention. The equipment in the same Piconet can turn the LED on at an optional time interval.

In FIG. 9, Steps S301–S308 are substantially the same as Steps S101–S108 explained in FIG. 7 of the first embodiment. Thus, after transmitting a coupling request to construct the Piconet (Step S301), the master device sends a call to the coupling object equipment (Step S302). The master device distinguishes whether a link key already exists (Step S303). If the link key exists (Step S303, YES), the operation goes to a certification process (Step S304). Then, an encryption key for ciphering is generated (Step S305). If the link key does not exist (Step S303, NO), the operation goes to a pairing process (Step S306). Next, a link key is generated by using the inherent address of 48 bits for the BlueTooth device, the random numbers of 128 bits, and a temporary link key generated as the parameters (Step S307) in the pairing process of Step S306. After generating the link key, the operation goes to the certification process (Step S304). The master device transmits master clocks to the slave equipment in the same Piconet (Step S308).

After establishing the Piconet, the master device acquires LED lighting data from corresponding master devices in another Piconet (Step S309). By excluding unavailable LED lighting data from the LED lighting data table, available LED lighting data is displayed (Step S310).

If the master access point 1 does not have a display unit, the master LED 46 flickers at several second intervals as a demonstration mode for available LED lighting data (Step S311). In order to determine the lighting interval for the LED 46, a standard switch provided on the master access point 1, e.g., a designation switch, is turned on during light emission of LED 46 in a desired lighting interval pattern.

If the master device has a screen display unit, available LED lighting data is displayed on the screen, and a lighting interval is selected. The LED performs a lighting demonstration in the selected lighting interval. If the demonstration is the desired lighting interval, the LED lighting interval is chosen by a determining operation, for example, by pressing the return key in the keyboard of the PC.

Once the LED lighting status is determined, the master device transmits LED lighting data to the respective master devices in another Piconet (Step S312). The transmission is through a scatter net in order to prevent the use of the same lighting data of the LED in the master device with the LED of another Piconet.

Then the master device transmits the LED lighting data to the slave devices In the Piconet (Step S313). After transmitting the LED lighting data, the master device turns on the LED provided in the same master device under the same lighting status (Step S314).

The operations for the slave devices are the same operations that were explained in the first embodiment.

Figure 10:
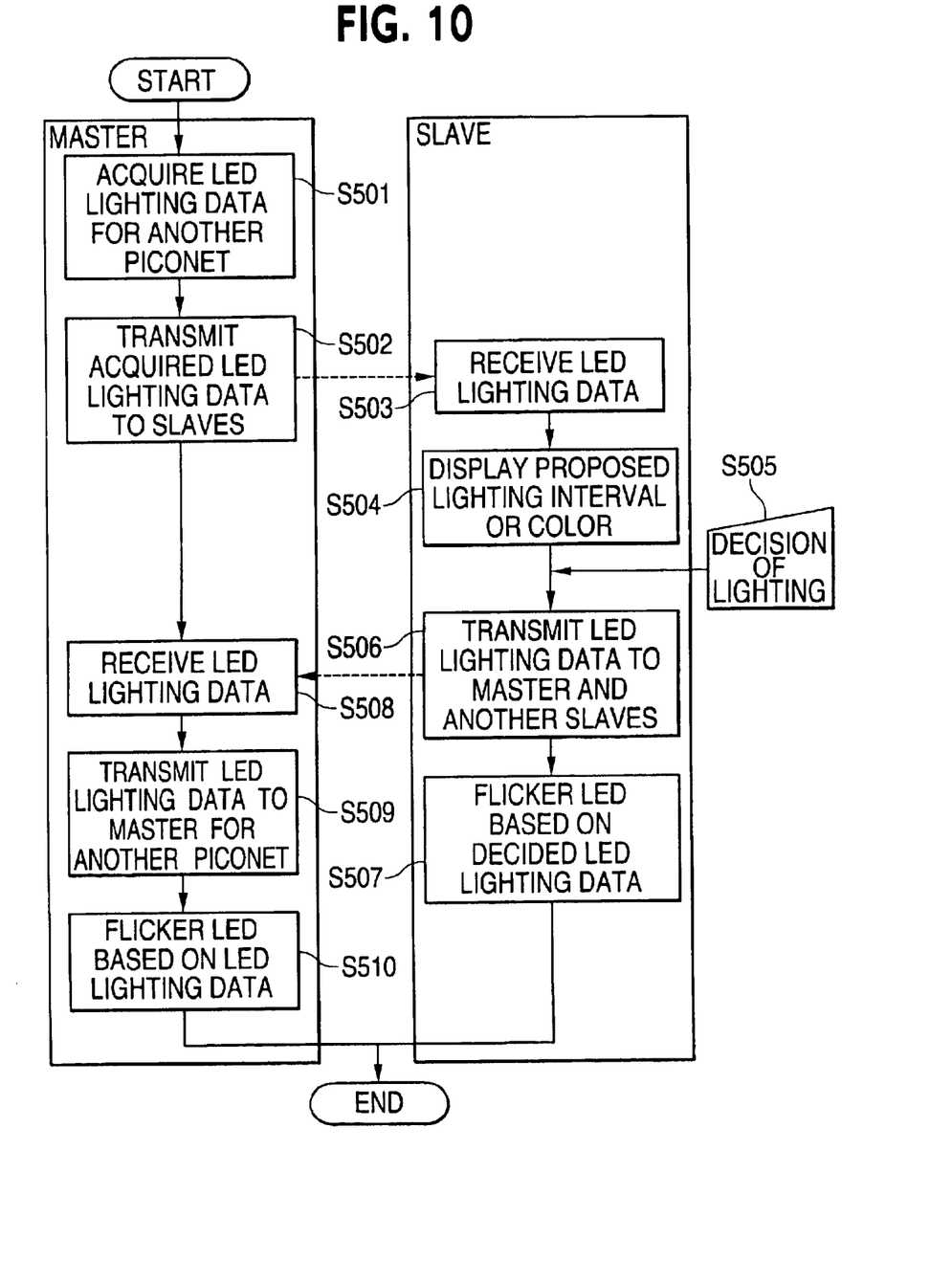
FIG. 10 is a flowchart of a third embodiment of the master equipment and the slave equipment used in a radio communication system consistent with the present invention.

FIG. 10 explains a third embodiment in which it becomes possible for a slave device to instruct the LED lighting status, i.e., the LED lighting interval or the emitting light color.

In FIG. 10, the master device initially constructs the Piconet under the same steps as Steps S101–S108 explained in FIG. 7. After constructing the Piconet, the master device acquires LED lighting data from the respective master device for another Piconet (Step S501). The acquired LED lighting data is transmitted to the slave devices (Step S502).

When the slave devices receive the LED lighting data from the master device (Step S503), the slave devices display an available LED lighting list based on the LED lighting data table (Step S504). Thus, the list shows available LED lighting data that can be used in the Piconet while avoiding the present use of LED lighting data.

Figure 11:
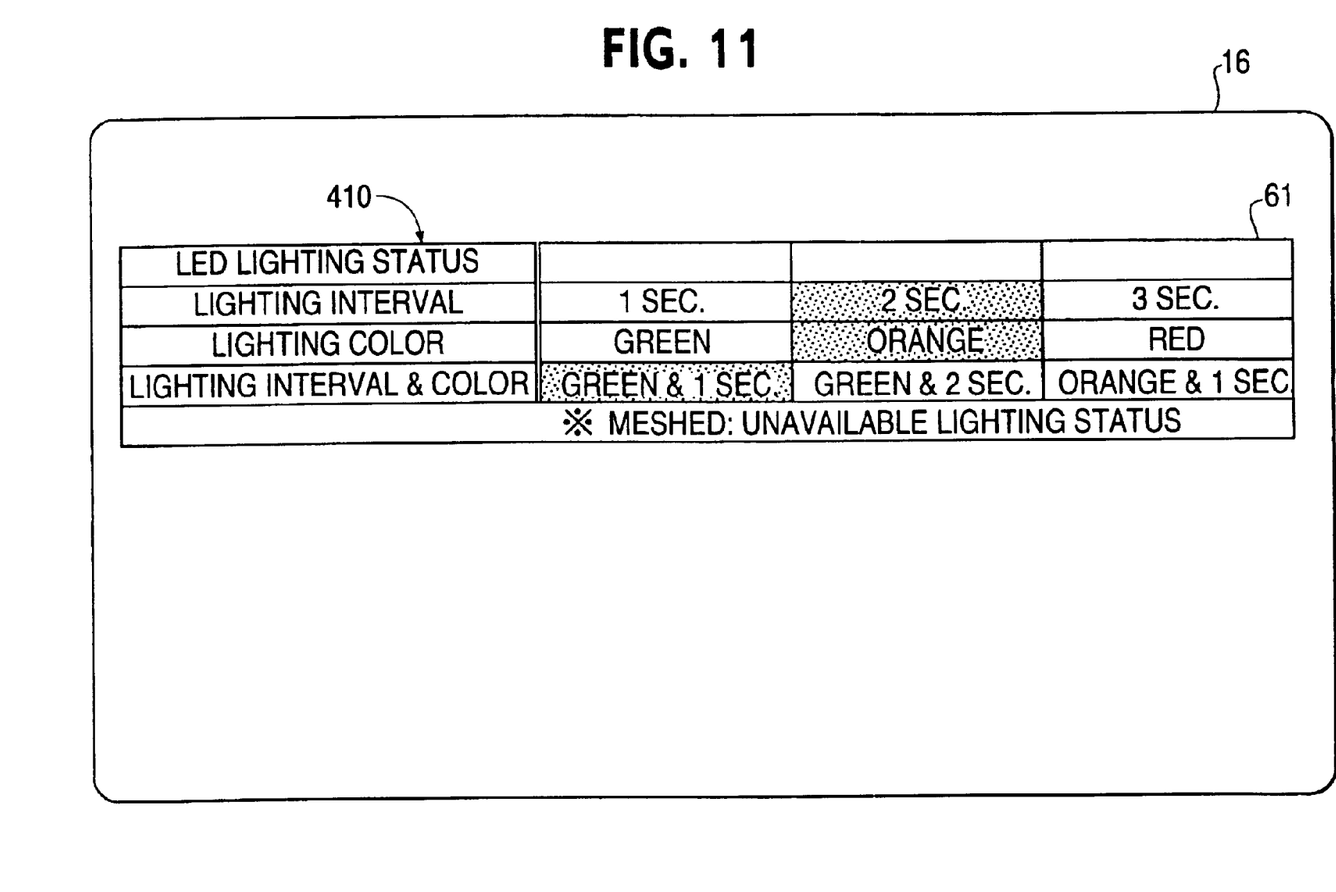
FIG. 11 illustrates an example of a light emitting list displayed on a LCD screen of a PC.

FIG. 11 illustrates an example of the available LED lighting list 61 displayed on an LCD screen 16 of a personal computer. In the displayed list, the shaded portions, e.g., the lighting interval of 2 seconds 412, the lighting color of orange 414, the combination 415 of the lighting interval of 1-second, and the lighting color of green are already used in another Piconet.

Accordingly, a user selects an available LED lighting data, among the list, by using a cursor key or a pointing device on a keyboard of the PC. The LED demonstrates a selected lighting interval and/or lighting color. The user selects the lighting status by pressing a return key in the keyboard of the PC (Step S505).

The selected LED lighting data, e.g. a lighting interval, is transmitted from the slave device to the master device and other slave devices (Step S506). After transmitting the selected LED lighting data, the slave device turns the LED on in accordance with the selected LED lighting data (Step S507).

When the master receives the selected LED lighting data from the slave device (Step S507), the master device transmits the selected LED lighting data to the master device of another Piconet. The transmission of the selected LED lighting data to the master device of another Piconet provides notification that the LED lighting data is in use. (Step S508). This transmission prevents the same LED lighting data from using another Piconet. The notice is performed through a scatter net. Then, the master device lights its own LED in accordance with the selected LED lighting data (Step S509).

It is possible for the master device, instead of the slave device, to select the LED lighting data.

In the present embodiments, PCs 3 and 5 do not include the BlueTooth modem. Consequently, the BlueTooth radio communication system is achieved by installing each of the PC cards 7 and 8, that includes the BlueTooth modem, into the card slots that are provided on the side wall of PCs 3 and 5 respectively. However, it is possible to include the Blue-Tooth modem in the body of the PCs itself. In this case, the discrimination of the Piconet is achieved by including the LED on the body of the PC.

As explained above, the apparatus and method, consistent with the present invention, can easily distinguish an available radio network system among a plurality of networks coupled to a plurality of devices.

Other embodiments of the present invention will be apparent to those skilled in the art from consideration of the specification and practice of the invention disclosed herein. In particular, the invention is applicable to any type of network systems that need to discriminate a particular network that is presently coupled to a particular device among a plurality of networks. The invention is, of course, applicable to any other type of networks, for example, a radio LAN or a wire network. It is intended that the specification and examples be considered as exemplary only, with a true scope and sprit of the invention being indicated by the following claims.

What is claimed is:

1. A radio network system comprising:
    a first radio communication equipment for transmitting and receiving data via radio, the first radio communication equipment including a first radio communication mechanism for performing radio communication and a first discrimination mechanism for visually distinguishing, from among a plurality of communication networks, a particular communication network coupled to the first radio communication equipment;
    a second radio communication equipment for transmitting to and receiving data from the first radio communication equipment via radio, the second radio communication equipment including a second radio communication mechanism for performing radio communication with the first radio communication equipment and a second discrimination mechanism for visually distinguishing, from among the plurality of communication networks, a particular communication network coupled to the second radio communication equipment; and
    a flickering mechanism for synchronously flickering both the first discrimination mechanism and the second discrimination mechanism with a particular lighting interval, when the first radio communication equipment is coupled to the second radio communication equipment via one of the plurality of networks.

2. The radio network system according to claim 1, wherein the first discrimination mechanism includes a first light emitting element for flickering with a particular lighting color synchronously when the first radio communication equipment is coupled to the second radio communication equipment via one of the plurality of networks; and the second discrimination mechanism includes a second light emitting element for flickering a particular lighting color synchronously when the first radio communication equipment is coupled to the second radio communication equipment via one of the plurality of networks.

3. The radio network system according to claim 2, wherein the first light emitting element in the first discrimination mechanism and the second light emitting element in the second discrimination mechanism flicker synchronously with a particular lighting color, when the first radio communication equipment is coupled to the second radio communication equipment via one of the plurality of networks.

4. The radio network system according to claim 2, wherein the lighting interval for flickering the light emitting element is synchronized with master clocks in the master device for the first radio communication equipment and the second radio communication equipment.

5. The radio network system according to claim 2, wherein:
the first light emitting element emits a plurality of different colors depending upon a particular radio communication network; and
the second light emitting element emits the same color among the plurality of different colors depending upon the particular radio communication network.

6. The radio network system according to claim 2, wherein the first light emitting element and the second light emitting element flicker synchronously with master clocks in the master device in order to transmit and receive data between the first radio communication equipment and the second radio communication equipment respectively.

7. The radio network system according to claim 2, wherein the first light emitting element and the second light emitting element start to light upon the construction of the radio network between the first radio communication equipment and the second radio communication equipment.

8. The radio network system according to claim 2, wherein the first radio communication equipment transmits lighting data for the first light emitting element to the second radio communication equipment; and
the second radio communication equipment causes the second light emitting element to emit in accordance with the transmitted lighting data.

9. The radio network system according to claim 2, wherein the second radio communication device transmits lighting data for the first light emitting element to the first radio communication equipment; and
the first radio communication device causes the first light emitting element to emit in accordance with the transmitted lighting data.

10. The radio network system according to claim 1, wherein:
the first radio communication equipment becomes a master device for performing the radio communication to a plurality of slave devices in the radio network system;
the second radio communication equipment becomes one of the slave devices in the radio network system for executing radio communication to the master device; and
the first discrimination mechanism in the master device and the second discrimination mechanism in the slave device are synchronously discriminated with a particular lighting interval, when the first radio communication equipment is coupled to the second radio communication equipment via one of the plurality of networks.

11. The radio network system according to claim 10, wherein the relationship between the master device and the slave device is interchangeable.

12. A method for communicating radio data among a plurality of master equipment and a plurality of slave equipment for the respective plurality of master equipment, comprising the steps of:
constructing a radio communication network between a master equipment and the corresponding slave equipment for the master equipment;
acquiring lighting data from other master equipment for their respective radio communication networks;
transmitting the acquired lighting data to the slave equipment;
displaying the received lighting data by selecting a lighting status among the displayed lighting data;
demonstrating the light emitting element by the selected lighting status for determining the lighting status;
transmitting the determined lighting status from the slave equipment to the master equipment and other slave equipment; and
turning on the light emitting element in the slave equipment in accordance with the transmitted lighting status.

* * * * *